United States Patent
Suzuki

(10) Patent No.: US 9,877,095 B2
(45) Date of Patent: Jan. 23, 2018

(54) MEMBER-FASTENING STRUCTURE

(71) Applicant: HONDA MOTOR CO., LTD., Minato-Ku, Tokyo (JP)

(72) Inventor: Shota Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 551 days.

(21) Appl. No.: 14/449,696

(22) Filed: Aug. 1, 2014

(65) Prior Publication Data

US 2015/0043961 A1 Feb. 12, 2015

(30) Foreign Application Priority Data

Aug. 9, 2013 (JP) .................. 2013-166714

(51) Int. Cl.
- *H04R 1/02* (2006.01)
- *B60R 11/02* (2006.01)
- *B62J 11/00* (2006.01)

(52) U.S. Cl.
CPC .......... *H04R 1/025* (2013.01); *B60R 11/0217* (2013.01); *B60R 11/0223* (2013.01); *B62J 11/00* (2013.01); *H04R 1/023* (2013.01); *Y10T 403/44* (2015.01)

(58) Field of Classification Search
CPC ..... H04R 1/025; H04R 1/023; B60R 11/0217; B60R 11/0223; B62J 11/00; Y10T 403/44
See application file for complete search history.

(56) References Cited

U.S. PATENT DOCUMENTS

| | | | | |
|---|---|---|---|---|
| 4,032,725 A * | 6/1977 | McGee | ................. | H04R 1/025 248/27.1 |
| 2007/0177754 A1* | 8/2007 | Kemmerer | ............. | H04R 1/023 381/391 |
| 2010/0252703 A1* | 10/2010 | Wright | ................... | H04R 1/025 248/221.11 |
| 2011/0200220 A1* | 8/2011 | Wright | ................... | H04R 1/028 381/332 |
| 2013/0129120 A1* | 5/2013 | Chen | ..................... | H04R 1/025 381/189 |
| 2016/0016091 A1* | 1/2016 | Allmendinger | ........ | A63H 17/34 446/456 |
| 2017/0026758 A1* | 1/2017 | Wen | ...................... | H04R 17/00 |

FOREIGN PATENT DOCUMENTS

| | | |
|---|---|---|
| JP | S5920741 A | 2/1984 |
| JP | 2010-041678 A | 2/2010 |

* cited by examiner

*Primary Examiner* — Elizabeth A Quast
(74) *Attorney, Agent, or Firm* — Carrier Blackman & Associates, P.C.; Joseph P. Carrier; Jeffrey T. Gedeon

(57) ABSTRACT

A member-fastening structure permits three members to be fastened and fixed such that a first member and a second member holds a third member therebetween. The fastening of three members is accomplished with a meter visor that has a first through-hole formed therein. A speaker ring has a projecting part formed thereon which is inserted into the first through-hole. The projecting part has a second through-hole formed therein in a direction perpendicular to a projecting direction of the projecting part. A speaker grille is positioned on the meter visor, and the projecting part of the speaker ring is then caused to project downward through the first through-hole of the meter visor. A clip is inserted into the second through-hole of the projecting part projecting from an underside of the meter visor, and is engaged with the second through-hole of the projecting part and the underside of the meter visor.

11 Claims, 10 Drawing Sheets

MEMBER-FASTENING STRUCTURE

CROSS-REFERENCE TO RELATED APPLICATIONS

The present disclosure claims priority under 35 USC 119 based on Japanese Patent Application No. 2013-166714, filed on Aug. 9, 2013. The entire subject matter of this priority document, including specification claims and drawings thereof, is incorporated by reference herein.

BACKGROUND

The present disclosure relates to a member-fastening structure to fasten and fix an on-vehicle member or the like held between a plurality of members.

As exemplified by the disclosure of Japanese Patent Laid-Open No. 2010-41678, known fastening structures for on-vehicle members fasten and fix three members together by way of a fastening member, such that the first and second members hold the third member therebetween. The first member is a mounting part (made of plastics) on the vehicle body, the second member is a speaker grille (made of plastics), and the third member is a speaker main body. To install such a fastening structure, the third member is positioned on the first member and then the second member is laid on the third member and finally the third member is fastened and fixed to the first member by means of tapping screws.

SUMMARY

The conventional member-fastening structure mentioned above, however, has some disadvantages of requiring complicated procedures and suffering from low efficiency at the time of mounting the speaker body, because it is designed such that the first member (a mounting part of the vehicle body) and the second member (a speaker grille) are arranged on top of the other, with the third member (a speaker body) placed between them, and then the second member is fastened to the first member by means of tapping screws.

Exemplary approaches disclosed herein of a new member-fastening structure overcome the foregoing disadvantages by permitting easy fastening of three members such that the first and second members hold the third member therebetween.

A first aspect of the disclosed member-fastening structure fastens and fixes together three members, each being a first member, a second member, and a third member held between the first member and the second member, by means of a fastening member. The first member has a first through-hole along a direction in which the three members are placed one over another. The second member has a projecting part to be inserted into the first through-hole of the first member, the projecting part having a second through-hole penetrating along a direction perpendicular to the direction in which the three members are placed one over another. The third member has an indexing part which engages with a passive indexing part provided at a position away from the first through-hole in the first member or at a position away from the projecting part in the second member so as to be positioned on either of the first member or the second member. The fastening member fixes the third member held between the first member and the second member by being inserted into the second through-hole of the projecting part projecting to a back side of the first member through the first through-hole and engaging with the second through-hole and the back side of the first member.

The member-fastening structure defined above is used as follows to attach the third member together with the second member to the first member. First, the indexing part of the third member is engaged with the passive indexing part, so that the third member is positioned on either of the first member and the second member. Then, the projecting part of the second member is inserted into the first through-hole of the first member. Finally, the fastening member is inserted into the second through-hole of the projecting part projecting toward the back side of the first member, so that the fastening member is engaged with the second through-hole and the back side of the first member. As the result, the third member is fixed, together with the second member, to the first member, with the third member held between the first member and the second member.

In a second aspect of the disclosed member-fastening structure, the first member is fixed to a vehicle. The second member is arranged on an outer side of a vehicle body relative to the first member and the third member, and the projecting part is arranged at a plurality of positions so as to project toward an inner side of the vehicle body. The third member is arranged inside the plurality of projecting parts of the second member so that the third member has its outer periphery held and fixed between the first member and the second member.

The member-fastening structure defined above is used as follows to attach the third member together with the second member to the first member. First, the third member is arranged inside the plurality of projecting parts of the second member which project toward the inside of the vehicle body. Then, each of the projecting parts is inserted into the corresponding first through-hole of the first member, and the fastening member is inserted into the second through-hole of each of the projecting parts. In this way, the second member is fastened to the first member at more than one place by the fastening part, and the outer periphery of the third member is held and fixed by the first member and the second member.

In a third aspect of the disclosed member-fastening structure, the second member is an annular member, and the projecting part is formed within a width of the annular shape of the second member such that a lengthwise direction of the projecting part is along a circular arc direction of the annular shape. The second through-hole penetrates through the projecting part along a radial direction of the annular shape of the second member.

In this case, the second member has the projecting part to be inserted into the first through-hole of the first member and the projecting part is formed within the width of the annular shape of the second member such that the lengthwise direction of the projecting part is along the circular arc direction of the annular shape. Consequently, the second member can be readily molded and the molded product looks good because the projecting part does not project outward in the widthwise direction of the annular shape. Moreover, the fact that the projecting part to be inserted into the first through-hole is formed along the circular arc direction of the annular shape of the second member readily prevents the second member from rotating with respect to the first member while the projecting part is inserted into the first through-hole.

According to a fourth aspect of the disclosed member-fastening structure, the projecting parts are formed at three approximately equally spaced places along the annular shape of the second member, and both the indexing part and the passive indexing part are arranged between two adjacent projecting parts of the second member.

In this case, the second member has the projecting parts to be inserted into the first through-holes of the first member and the projecting parts are arranged at three places which are approximately equally spaced along the annular shape of the second member, so that the second member can be stably fastened and fixed to the first member in the circumferential direction and the third member is securely held between and fixed to the first member and the second member. Moreover, the indexing part and the passive indexing part are arranged between the two adjacent projecting parts, so that the third member can be accurately arranged in the circumferential direction and radial direction with respect to the first member and the second member. This prevents the outer peripheral surface of the third member from coming into contact with the projecting part of the second member.

In a fifth aspect of the disclosed member-fastening structure, the first member is a covering member that covers the vehicle body and has an opening, the third member is a speaker grille attached to a periphery of the opening of the covering member, and the second member is a speaker ring that covers an outside of a periphery of the speaker grille and is attached to the covering member.

Accordingly, the speaker grille can be easily attached to the covering member of the vehicle body by the speaker ring that covers the peripheral outside of the speaker grille. Moreover, the fact that the peripheral outside of the speaker grille is held by the speaker ring contributes to the good appearance of the speaker grille and also permits the speaker ring to suppress vibration around the speaker grille.

According to the disclosed member-fastening structure, three members can be easily fastened and fixed together without using screws simply by engaging the indexing part of the third member with the passive indexing part of the first member or the second member, inserting the projecting part of the second member into the first through-hole of the first member, inserting the fastening member into the second through-hole of the projecting part that projects toward the back side of the first member, and finally causing the fastening member to engage with the second through-hole and the back side of the first member.

DETAILED DESCRIPTION

Exemplary approach to a member-fastening structure will be described in more detail with reference to the accompanying drawings. Unless otherwise stated, the following description employs a convention that the direction (such as left, right, forward, and backward) of parts corresponds to that of the vehicle. Also, the drawings referred to by the following description contain arrow symbols FR, LH, and UP, which respectively denote the forward direction, left-hand direction, and upward direction of the vehicle.

Figure 1:
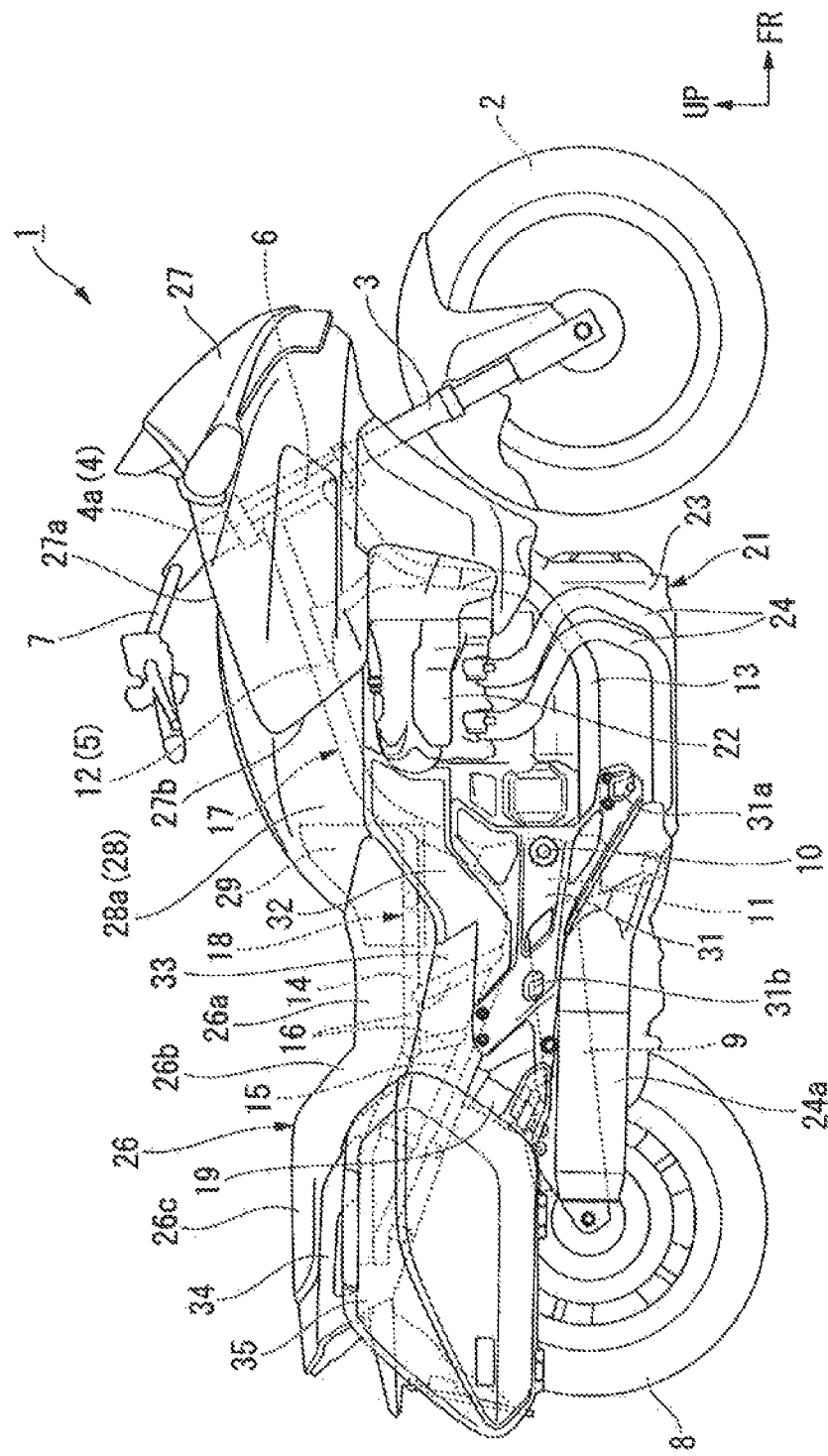
FIG. 1 is a right side view of a motorcycle according to an exemplary approach to a member-fastening structure.
Figure 2:
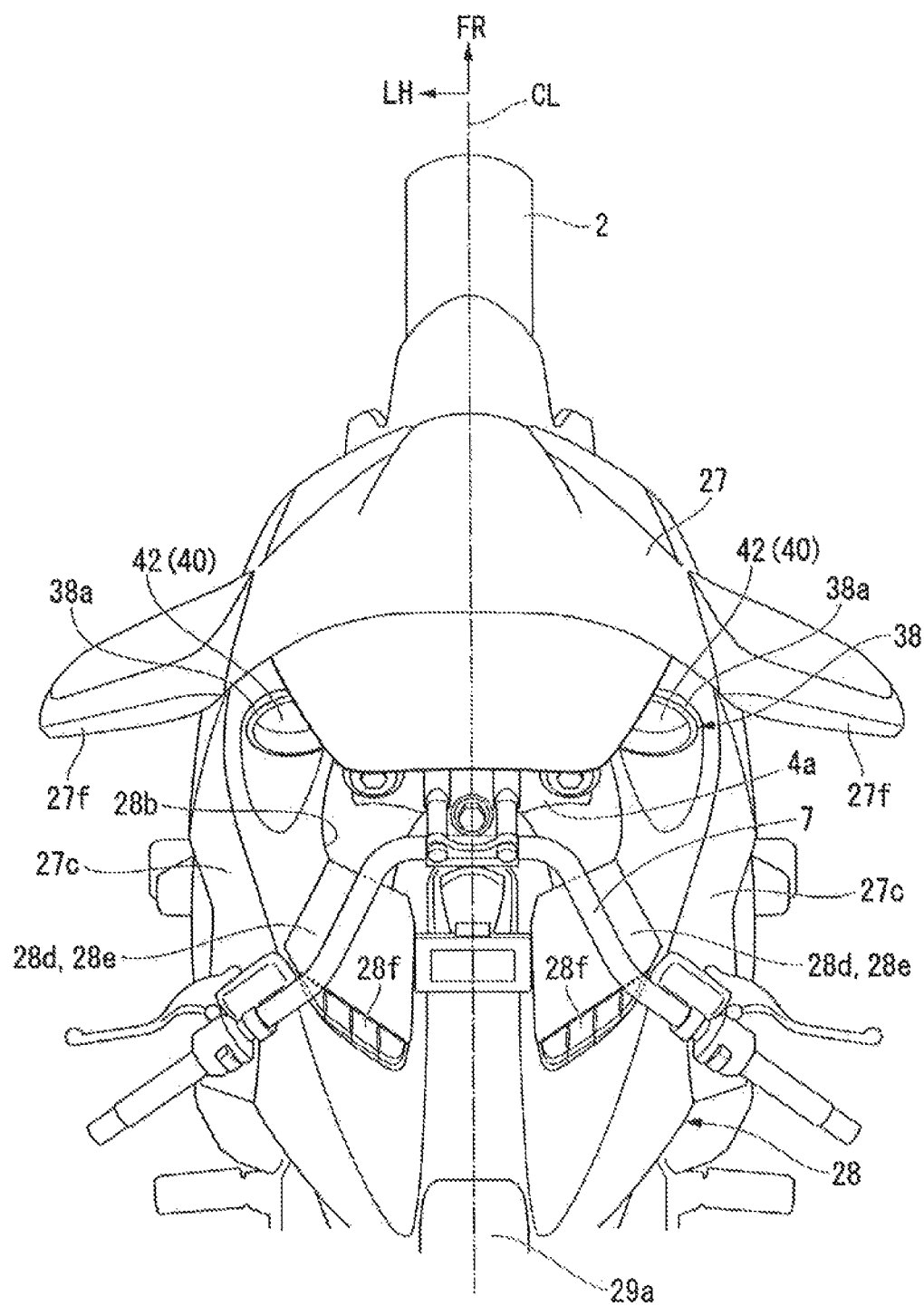
FIG. 2 is a top view of the vehicle body front part of the motorcycle.

FIG. 1 is a drawing showing the right side of a motorcycle 1 provided with a member-fastening structure. FIG. 2 is a drawing showing the front top of the same motorcycle 1 as above.

The motorcycle 1 has a front wheel 2 which is pivotally mounted at the lower ends of a front fork 3, an upper part of which is pivotally supported by a head pipe 6 at the fore-end of a body frame 5 so that the front fork 3 is maneuvered through a steering stem 4. To a top bridge 4a of the steering stem 4 is attached a bar handle 7 for front wheel steering. The motorcycle 1 has a rear wheel 8 which is pivotally supported by the rear end of a swing arm 9.

The swing arm 9 has its fore-end pivotally mounted for its vertical swinging by a pivot frame 11 (paired side to side) through a pivot axis (not shown) thereof. The pivot frame 11 is at the middle of the longitudinal length of the body frame 5. The swing arm 9 is divided into left and right arms, and the rear end of each arm is provided with the lower end of a rear cushion 19. Arms of the rear cushion 19 have their upper ends attached respectively to left and right side parts of a rear seat frame 18 of the body frame 5.

The body frame 5 is provided with the following members. Main tubes 12 (paired side to side) which extend downward and backward from an upper part of the head pipe 6 and sharply bend and further extend downward. The pivot frames 11 (paired side to side) which join respectively to the rear lower ends of the main tubes 12. Down frames 13 (paired side to side) which extend backward and downward (making a crank-like bend) from a lower part of the head pipe 6 and bend backward and further extend nearly horizontally, so that the rear ends thereof join to the front side of the lower end of each of the pivot frames 11. Seat rails 14 (paired side to side) which extend backward from a rear part of each of the main tubes 12. Support frames 15 (paired side to side) which extend backward and upward from the upper rear side of the pivot frames 11 and join to the rear end of each of the seat rails 14.

The seat rail 14 and the support frame 15 are joined together through a plurality of connecting pipes 16, and the left and right seat rails 14 are joined together through a cross member (not shown). The seat frame 18 is made up of the seat rail 14, the support frame 15, the connecting pipe 16, the cross member, and other members.

Also, the main tubes 12, the down frames 13, and the pivot frames 11 have their respective left and right constituents suitably joined together through a cross member (not shown). A main frame 17, which is the front part of the body frame 5, contains the foregoing main tube 12, down frame 13, pivot frame 11, cross member, and head pipe 6.

On the main frame 17 is mounted an engine unit 21 which is a prime mover of the motorcycle 1. The engine unit 21 contains a longitudinal water-cooled four-stroke four-cylinder V-engine, with its crankshaft arranged in the longitudinal direction. The left and right two cylinders 22 of the engine unit 21 have their respective exhaust pipes 24 extending from the outside thereof. Each of the exhaust pipes 24 extends forward and downward and then bends backward and further extends to the fore-end of a silencer 24a, which is arranged outside the swing arm 9, and finally joins to the silencer 24a. The engine unit 21 also has a crank case 23 thereunder which holds therein a transmission (not shown). The transmission has its output joined to a propeller shaft passing through the inside of the right arm of the swing arm 9, so that the propeller shaft transmits power to the rear wheel 8 through a final gear arranged on the right side of the rear wheel 8.

On the seat frame 18 is supported a seat 26, which integrally includes a front seat 26a for the driver and a rear seat 26c for the pillion passenger. The rear seat 26c rises above the front seat 26a, with a backrest 26b between them connecting them together. At the front side of the seat 26 is arranged a top shelter 28 which covers the left and right entire width of the inside of a front cowl 27 and also extends backward (with the left and right width decreasing) to form a knee grip 28a. There is arranged a fuel tank 29 in that part which spans from the rear inside of the top shelter 28 to the underside of the front seat 26a. At the rear center of the top shelter 28 is provided a refueling lid 29a (shown in FIG. 2).

In FIG. 1, there is shown a step plate 31 which is so mounted over the middle to rear parts of the vehicle body as to cover the pivot frame 11 for a good appearance and also to support a front step 31a (for the driver) and a rear step 31b (for the pillion passenger). This step plate 31 has a cap 10, which, when removed, permits the pivot axis (not shown) and the swing arm 9 to be removed.

In FIG. 1, there are also shown a center side cover 32 which is mounted above the step plate 31, a rear side cover 33 which extends backward from the center side cover 32, and a side bag (or saddle bag) 35 which is removably mounted on the rear side of the vehicle body. In FIG. 2, there are shown mirrors 27f mounted on both sides of the front cowl 27.

As shown in FIG. 2, the top shelter 28 has a front opening 28b formed at the front part thereof, which permits the bar handle 7 and the top bridge 4a to be rotatably inserted therethrough. At the front side of the front opening 28b is arranged a meter panel (not shown) containing a speed meter. On an inner wall of the front cowl 27 is mounted a meter visor 38 (made of plastics) which covers the meter panel. The meter visor 38 has speaker housing parts 38a each extending therefrom in which on-vehicle audio speakers 40 are arranged on both sides symmetrical about a central region where the meter panel is arranged.

On the rear both sides of the front opening 28b are arranged lids 28e of an article case 28d. The lids 28e open upward to a limited extent so that they do not interfere with the maneuvering of the bar handle 7. On the rear of the lids 28e are arranged left and right controls 28f for the on-vehicle audio.

Figure 3:
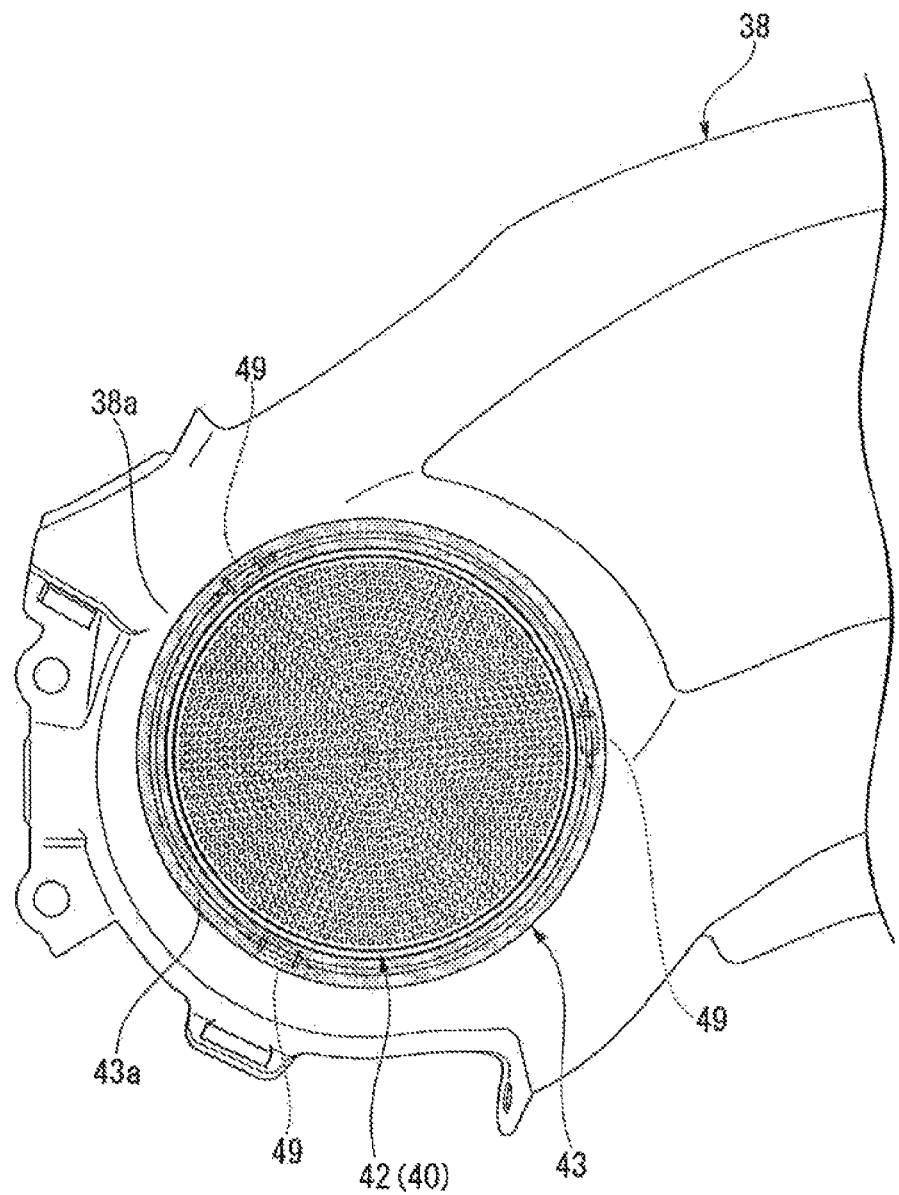
FIG. 3 is a front view of a speaker grille mounting part.
Figure 4:
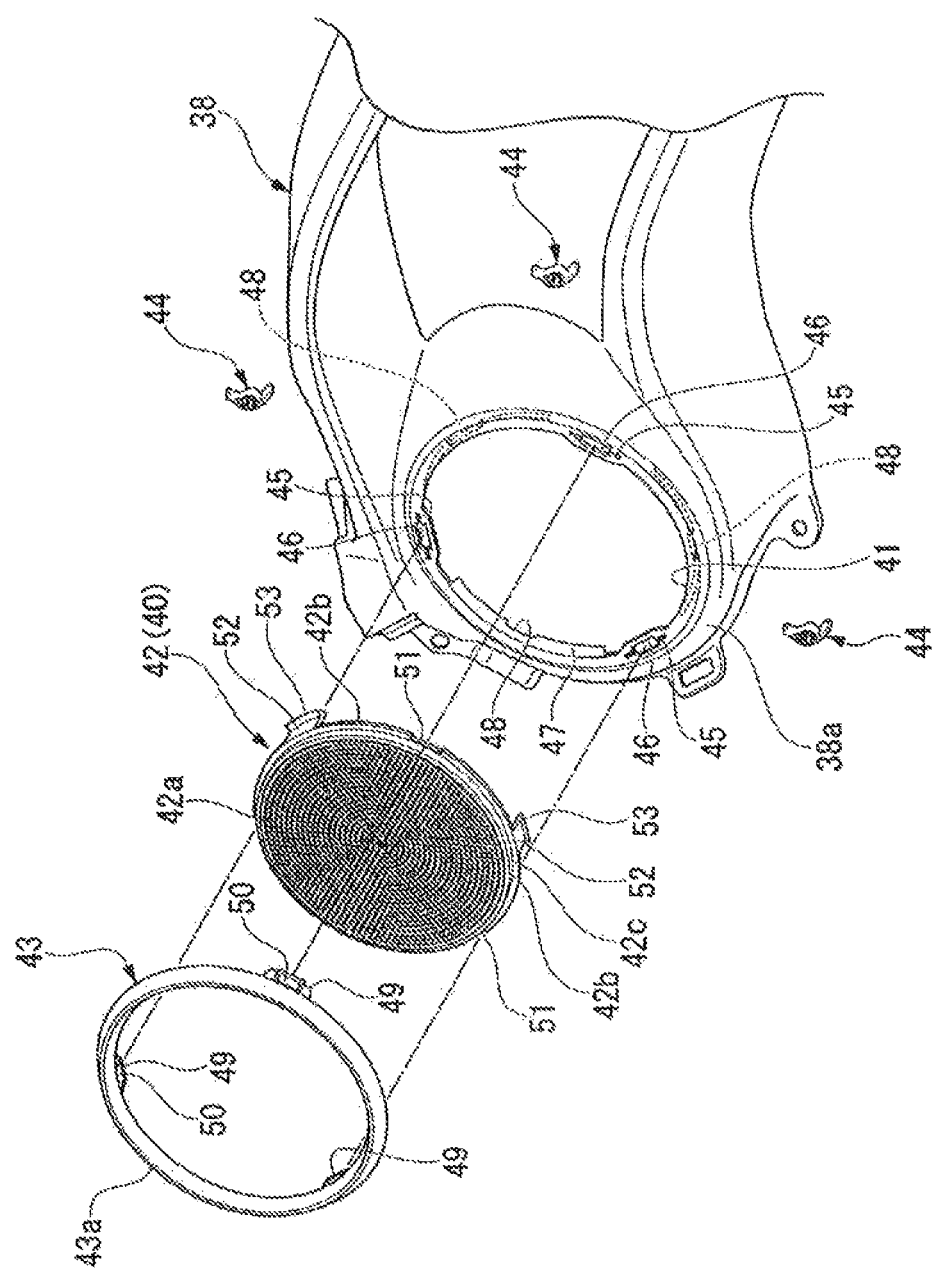
FIG. 4 is an exploded perspective view of the speaker grille mounting part.

FIG. 3 is an enlarged view showing the left speaker housing part 38a of the meter visor 38 in which the speaker 40 is installed. FIG. 4 is an exploded perspective view, with the left speaker 40 and parts thereof removed from the meter visor 38. The following is a description of an attaching part of the speaker 40 on the meter visor 38. For convenience of explanation of the meter visor 38 and members attached thereto, the side facing the driver is called "up" and the opposite side is called "down."

The speaker housing part 38a (at the end of the meter visor 38 in the widthwise direction of the vehicle body) has an opening 41 which is approximately circular in shape. The opening 41 has a peripheral part for attachment of a speaker grille 42 (made of plastics) which covers the upper side of a speaker proper (not shown). The speaker grille 42 has the grille proper 42a which is circular in shape with an approximately the same outside diameter as the opening 41, and the grille proper 42a has a plurality of small holes for sound passage. The grille proper 42a of the speaker grille 42 has in its periphery a cylindrical wall 42b (which extends short downward) and an approximately toroidal flange 42c (which extends radially outward from the lower end of the cylindrical wall 42b).

The speaker grille 42 is placed from above on the periphery of the opening 41 of the meter visor 38, and the flange 42c and the periphery of the opening 41 of the meter visor 38 are covered from above with a toroidal speaker ring 43 (made of plastics). The speaker ring 43 is fastened and fixed to the meter visor 38 with a clip 44 (or fastening member made of plastics), so that the speaker grille 42 is held between the speaker ring 43 and the meter visor 38 and fixed to the meter visor 38. (This will be described in more detail later.)

In this exemplary approach, the meter visor 38 constitutes the first member, the speaker ring 43 constitutes the second member, and the speaker grille 42 constitutes the third member.

Figure 5:
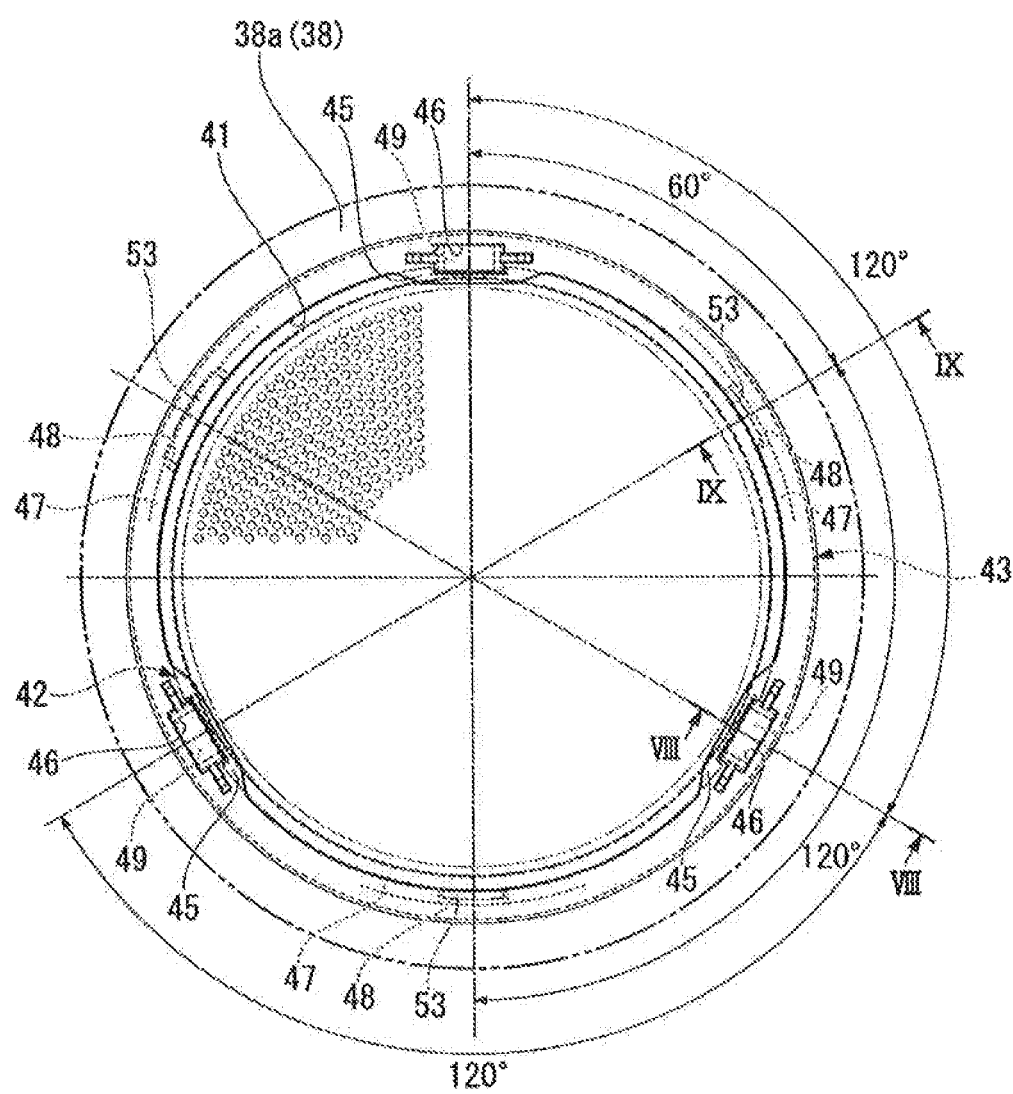
FIG. 5 is a front view of a meter visor.
Figure 6:
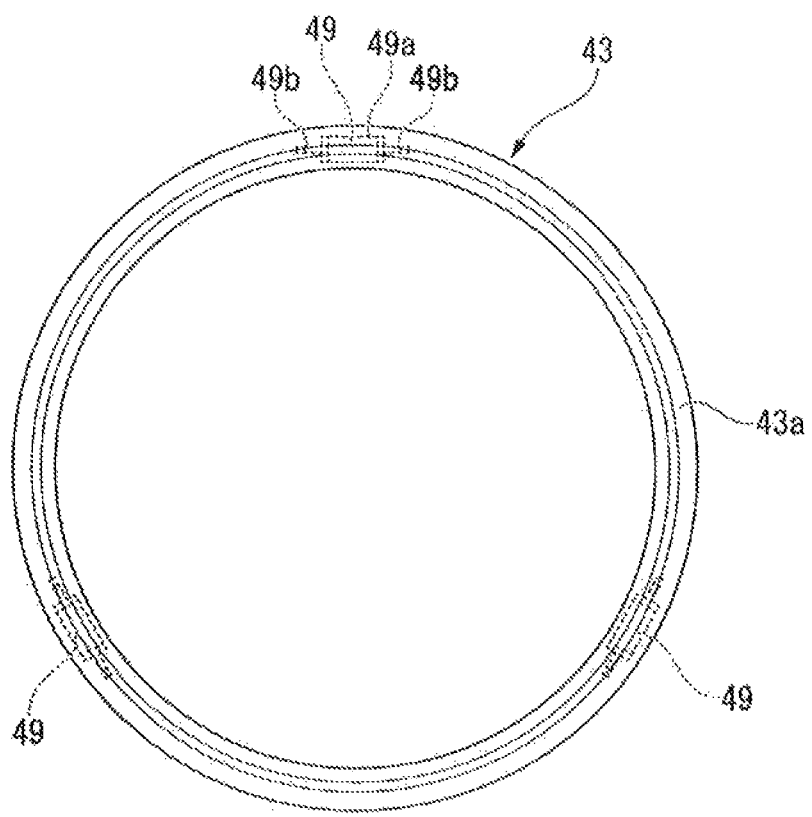
FIG. 6 is a plan view of a speaker ring.
Figure 7:
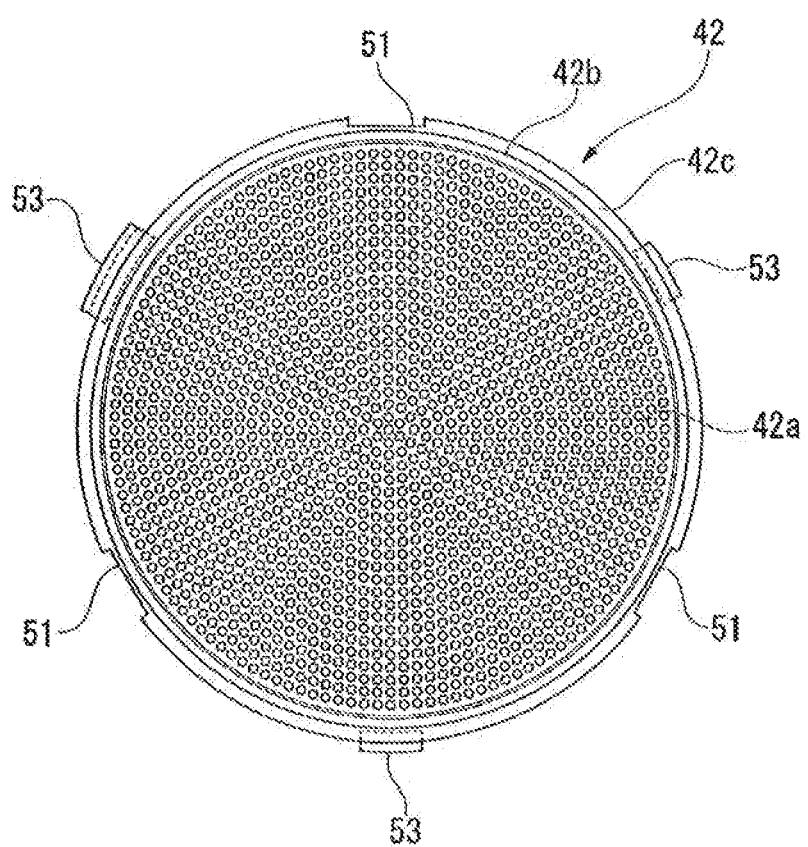
FIG. 7 is a plan view of a speaker grille.
Figure 8:
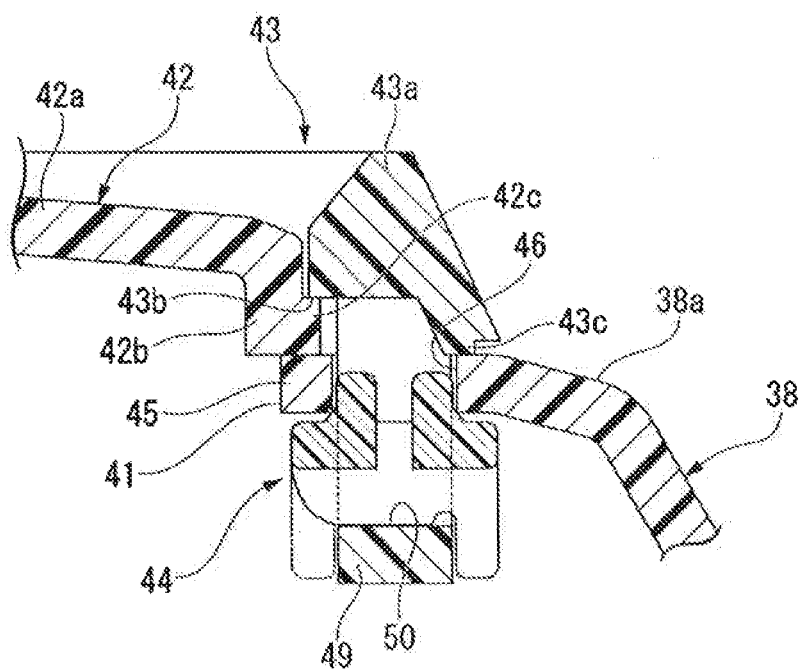
FIG. 8 is a sectional view of the speaker grille mounting part, taken along line VIII-VIII in FIG. 5.
Figure 9:
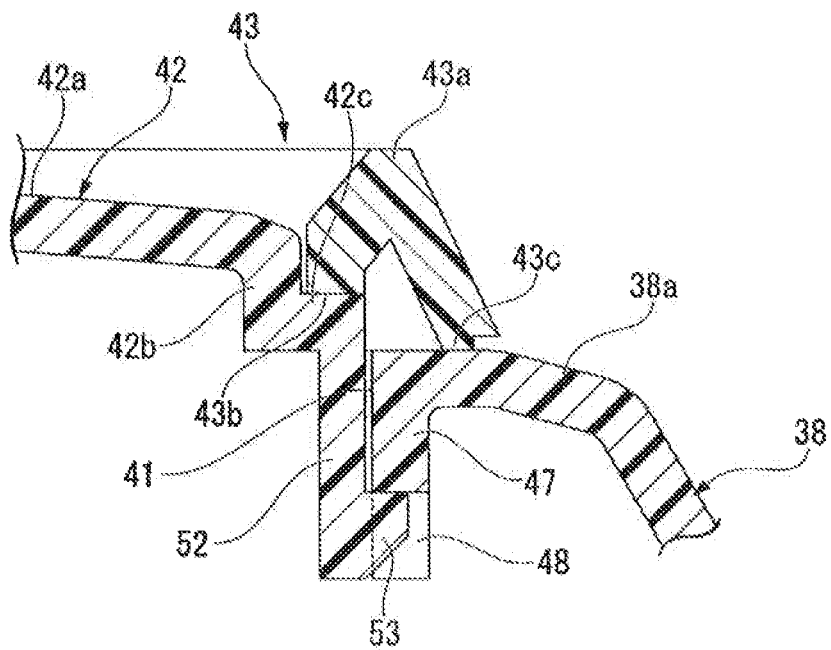
FIG. 9 is a sectional view of the speaker grille mounting part, taken along line IX-IX in FIG. 5.

FIG. 5 depicts the speaker housing part 38a of the meter visor 38. FIGS. 6 and 7 depict respectively the speaker ring 43 and the speaker grille 42. FIGS. 8 and 9 are sectional views respectively taken along lines VIII-VIII and IX-IX in FIG. 5 which depicts the meter visor 38 to which are attached the speaker grille 42 and the speaker ring 43.

As shown in FIGS. 4 and 5, the speaker housing part 38a of the meter visor 38 has three projecting parts 45 (trapezoid in shape) projecting inward from the periphery of the opening 41. The three projecting parts 45 are arranged (at equal intervals of 120°) along the periphery of the opening 41. Each of the projecting parts 45 has a flat top, on which are placed the cylindrical wall 42b of the speaker grille 42 and the bottom of the flange 42c, as shown in FIG. 8. There is a first through-hole 46 drilled in the place where the projecting part 45 is formed; this through-hole 46 penetrates the wall of the periphery of the opening 41 in such a direction that the meter visor 38, the speaker grille 42, and the speaker ring 43 are placed one over another. Each of the first through-hole 46 spreads partly over the projecting part 45. In addition, each of the first through-hole 46 includes a rectangular hole proper (shown without symbol) approximately parallel to the tangential direction of the opening 41 and extended parts (shown without symbol), narrower than the hole proper, each extending from both ends of the hole proper in the lengthwise direction.

Moreover, the opening 41 of the meter visor 38 has three circular walls 47 projecting downward from the periphery thereof. Each of the circular walls 47 is positioned between adjacent projecting parts 49 of the speaker ring 43 when the speaker ring 43 is attached to the meter visor 38. The circular wall 47 has a passive indexing part 48 (rectangular notch) at the center of the circular arc on its bottom.

As shown in FIGS. 6, 8, and 9, the speaker ring 43 has a toroidal ring proper 43a and the three projecting parts 49 separately arranged on the underside thereof. The three projecting parts 49 are arranged at equal intervals (120°) along the circumference of the ring proper 43a. Each of the projecting parts 49 is so formed as to be inserted into the first through-hole 46. Moreover, the projecting part 49 is formed such that its lengthwise direction is approximately parallel to the circular arc of the ring proper 43a within the width of the ring proper 43a. The projecting part 49 includes a rectangular projecting part proper 49a approximately parallel to the tangential direction of the ring proper 43a and a reinforcement projecting part 49b (narrower than the projecting part proper 49a) connected in the lengthwise direction to both ends of the projecting part proper 49a.

The projecting part 49 has a rectangular second through-hole 50 that penetrates the projecting part 49 in the radial direction of the ring proper 43a. The second through-hole 50 exposes itself to outside from the projecting area of the projecting part 49 projecting from the underside of the meter visor 38 when the projecting part 49 is inserted downward into the corresponding first through-hole 46 of the meter visor 38. The second through-hole 50 of the projecting part 49 is formed such that the clip 44 (as a fastening member) engages with the second through-hole 50 on the underside of the meter visor 38.

The ring proper 43a of the speaker ring 43 is constructed as shown in FIGS. 8 and 9; its inner periphery has a flat lower surface 43b which comes into contact with the upper surface of the flange 42c of the speaker grilles 42 placed thereon, and its outer periphery has a lip 43c which extends obliquely downward and outward in the radial direction such that the fore-end thereof comes into contact with the periphery of the opening 41 of the meter visor 38.

The flange 42c of the speaker grilles 42 is constructed such that its outer peripheral surface has three notches 51 which correspond to the three projecting parts 49 of the speaker ring 43. The notches 51 are formed in order that the outer periphery of the speaker ring 43 does not interfere with the projecting parts 49 of the speaker ring 43 when the projecting parts 49 fit into the corresponding first through-holes 46 of the meter visor 38. The three notches 51 are arranged at equal intervals on the outer periphery of the flange 42c.

The flange 42c has on the lower surface thereof three extended walls 52 arranged at equal intervals in the circumferential direction, and each of the extended walls 52 has on the lower end thereof an engaging hook 53 which projects outward in the radial direction of the flange 42c. Each of the engaging hooks 53 is formed at a position corresponding to the passive indexing part 48 at the lower end of the circular wall 47 of the meter visor 38. The engaging hook 53 fits into the corresponding passive indexing part 48 when the speaker grille 42 is installed on the meter visor 38 so that the speaker grille 42 is positioned in the circumferential and radial directions with respect to the meter visor 38. According to this exemplary approach, the engaging hook 53 constitutes an indexing part of the speaker grille 42 (the third indexing part).

Figure 10:
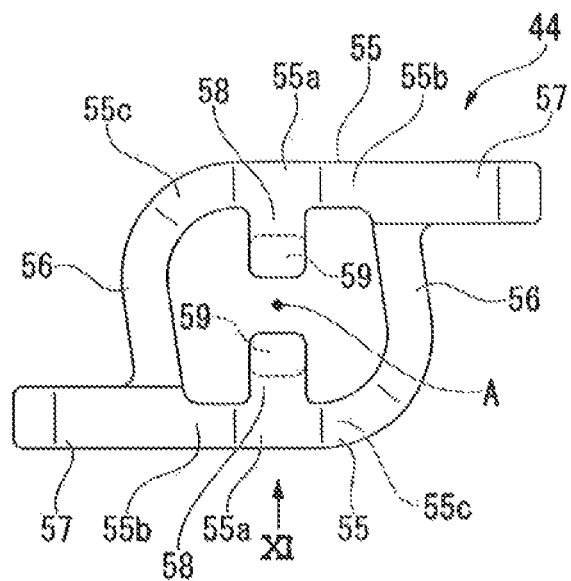
FIG. 10 is a plan view of a fastening member.
Figure 11:
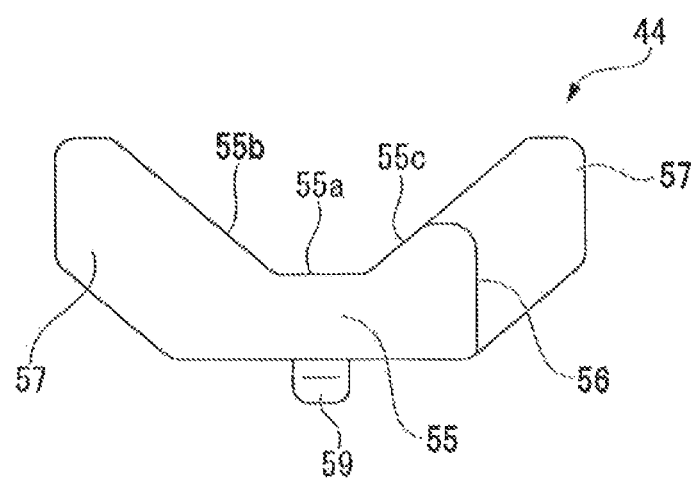
FIG. 11 is a side view of the fastening member, as seen in the direction of arrow XI in FIG. 10.

FIGS. 10 and 11 are a plan view and a side view, respectively, of the clip 44 as the fastening member.

As shown in FIG. 10, the clip 44 is formed in approximately cylindrical shape, with its plan view being approximately square; it has paired long side walls 55 (which are approximately parallel to each other) and paired short side walls 56 (which are approximately parallel to each other). The long side walls 55 extend slightly longer than the short side walls 56, and each of the long side walls 55 has at one end thereof an insertion guide wall 57 which extends obliquely upward. The two insertion guide walls 57 extend parallel to and opposite to each other. In addition, each of the short side walls 56 has one end thereof connected at approximately right angle to one of the long side walls 55 near the place where it joins to the insertion guide wall 57, and each of the short side walls 56 has the other end thereof connected in a curved shape to the other of the long side walls 55. The clip 44 is rotationally symmetric to a central axis line A.

As shown in FIG. 11, the clip 44 is shaped such that the long side wall 55 is depressed in the vicinity of its center and a depressed part 55a has slopes 55b and 55c extending sideward. The slope 55b of these slopes continues to the slope of the upper surface of the insertion guide wall 57.

Each of the long side walls 55 has a projecting piece 58 which projects toward the central axis line A from an approximately central position of the extending direction, and each of the projecting pieces 58 has at its end a regulating projection 59 which projects downward from the lower surface of the long side wall 55 and the short side wall 56. The two regulating projections 59 are formed such that the distance between their opposite side surfaces is approximately equal to the width of the first through-hole 46 of the meter visor 38 (or the width in the radial direction of the opening 41).

The following is the actual procedure to mount the speaker grille 42, together with the speaker ring 43, onto the speaker housing part 38a of the meter visor 38. The first step is to insert the engaging hook 53 of the speaker grille 42, with the extended wall 52 thereof being deflected and deformed, into the opening 41 of the meter visor 38. This step is carried out by adjusting the circumferential position of the speaker grilles 42 so that the engaging hook 53 of the speaker grille 42 coincides with the position of the passive indexing part 48 in the opening 41, and the engaging hook 53 is fitted into the corresponding passive indexing part 48. The result of the foregoing step is that the speaker grille 42 is positioned on the periphery of the opening 41 in its circumferential and radial directions (as shown in FIG. 9), and that the cylindrical wall 42b of the speaker grille 42 and the lower surface of the flange 42c are placed on the upper surface of the projecting part 45 of the periphery of the opening 41 (as shown in FIG. 8).

In the second step, the projecting part 49 of the speaker ring 43 is fitted into the first corresponding through-hole 46 of the meter visor 38, so that the fore-end of the projecting part 49 projects from the underside of the meter visor 38.

Subsequently, the clip 44 is engaged with the second through-hole 50 of the projecting part 49 and the underside of the meter visor 38. This step is carried out by inserting the paired long side walls 55 of the clip 44 into the second through-hole 50 and inserting the paired regulating projections 59 (projecting from the underside of the clip 44) into the first through-hole 46 of the meter visor 38. In this state, the lower long side wall 55 of the clip 44 is merely inserted into the second through-hole 50 and hence there is no fastening force between the projecting part 49 (speaker ring 43) and the underside of the meter visor 38.

The final step is to turn the clip 44 around the central axis line A. Thus, the clip 44 changes its direction by 90°, with its surrounding wall (the long side wall 55 and the short side wall 56) elastically deformed, until it stops rotation when the paired insertion guide walls 57 come into contact with the lateral side of the projecting part 49. At this time, the tall paired short side walls 56 are pushed into the second through-hole 50 so that a fastening force occurs between the projecting part 49 (speaker ring 43) and the underside of the meter visor 38. In addition, the paired regulating projections 59 (projecting from the underside of the clip 44) come into contact with the inner wall of the first through-hole 46 of the meter visor 38 (or move to the neighboring position). This restricts backlash between the projecting part 49 and the second through-hole 50 of the clip 44.

According to the exemplary approach mentioned above, there is provided a fastening structure to fasten the speaker grille 42 and the speaker ring 43 to the meter visor 38. The fastening structure works in the following way. First, the engaging hook 53 of the speaker grille 42 is fitted into the passive indexing part 48 on the meter visor 38 so that the speaker grille 42 is positioned on the meter visor 38. Then, the projecting part 49 of the speaker ring 43 is inserted into the first through-hole 46 of the meter visor 38. The clip 44 is inserted into the second through-hole 50 of the projecting part 49 (projecting from the underside of the meter visor 38). Finally, the clip 44 is turned through 90° so that it engages with the second through-hole 50 and the underside of the meter visor 38. The foregoing simple procedure permits the speaker grille 42, the speaker ring 43, and the meter visor 38 to be fastened and fixed together easily and accurately without requiring screws.

The fastening structure according to this exemplary approach is characterized in that the speaker ring 43 has the plurality of projecting parts 49 projecting toward the inside of the vehicle body (or the inside of the meter visor 38). Thus, the speaker grille 42 is held and fixed between the speaker ring 43 and the meter visor 38, with the outer periphery (the flange 42c) of the speaker grille 42 arranged inside the plurality of projecting parts 49. In this way, the outer periphery of the speaker grille 42 can be stably fastened to the meter visor 38. According to this exemplary approach, the speaker grille 42 is held between the speaker ring 43 and the meter visor 38 and its outer periphery is held at more than one position. This fastening structure, therefore, does not need accurate drilling to fasten the speaker grille 42, and this leads to cost reduction.

The fastening structure according to this exemplary approach is characterized in that the toroidal speaker ring 43 has the projecting part 49 which is narrower than the width of the ring proper 43a and which extends in the lengthwise direction along the tangential line (or circular arc direction) of the ring proper 43a, and the projecting part 49 has the second through-hole 50 which is formed along the radial direction of the ring proper 43a. The speaker ring 43 of this construction can be readily molded with a good appearance. Moreover, the fact that the projecting part 49 is formed along the tangential line of the ring proper 43a offers an advantage of readily restricting the speaker ring 43 from being turned relative to the meter visor 38.

The fastening structure according to this exemplary approach also offers the following advantage. The speaker ring 43 has the projecting parts 49 which are formed at equally spaced three places along its annular shape. Moreover, the engaging hook 53 (of the speaker grille 42) to position the speaker grille 42 on the meter visor 38 and the passive indexing part 48 of the meter visor 38 are arranged between the two adjacent projecting parts 49 of the speaker ring 43. This constitution permits the speaker grille 42 to be stably fastened in the circumferential direction and also permits the speaker grille 42 to be accurately positioned in the circumferential and radial directions of the meter visor 38. This prevents the speaker grille 42 from coming into contact with the projecting part 49 to damage it.

The fastening structure in this exemplary approach offers another advantage as follows. The speaker ring 43 covering the outer periphery of the speaker grille 42 has the projecting parts 49 which, after penetration through the meter visor 38, is pressed against and fastened to the underside of the meter visor 38 by the clip 44, with the speaker grille 42 held between the speaker ring 43 and the meter visor 38. The speaker grille 42 covered with the speaker ring 43 in this manner contributes to a good appearance. The speaker ring 43 thus mounted suppresses vibrations around the speaker grille 42.

It should be apparent that the disclosure provided herein is not restricted to the exemplary approach mentioned above; it may be variously changed and modified within the scope thereof. For example, the foregoing exemplary approach, which is designed such that the speaker grille 42 is positioned on the meter visor 38 and then the three members are fastened and fixed together, may be modified such that the speaker grille 42 is positioned on the speaker ring 43 and then the three members are fastened and fixed together in the same way as in other exemplary approaches.

Figure 12:
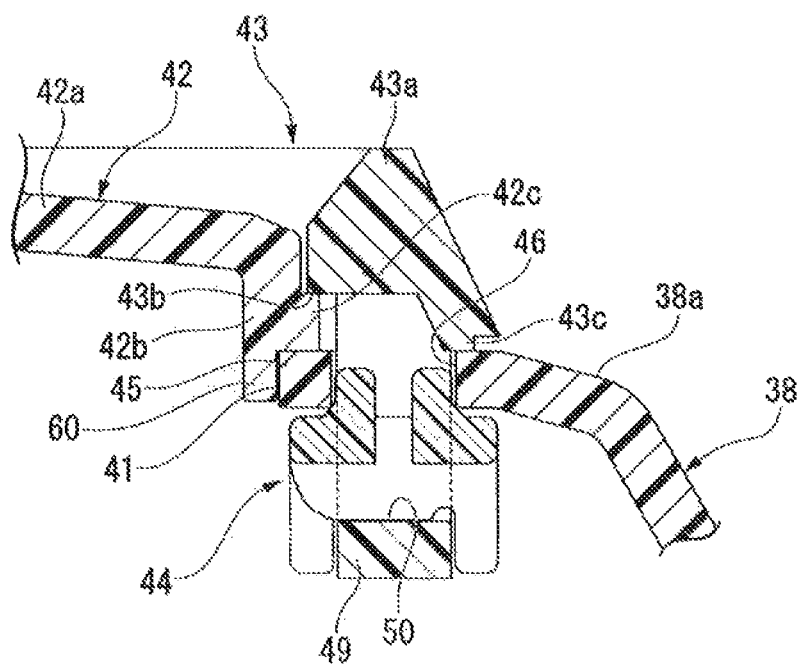
FIG. 12 is a sectional view which, like FIG. 9, shows a speaker grille mounting part according to an exemplary approach to a member-fastening structure.

According to another exemplary approach, as shown in FIG. 12, the cylindrical wall 42b on the outer periphery of the speaker grille 42 may have a displacement restricting wall 60 extending from the lower end thereof which faces the inner peripheral surface of the opening 41 of the meter visor 38. FIG. 12 employs identical symbols for identical components in FIGS. 1 to 11.

This exemplary approach causes the displacement restricting wall 60 at the lower end of the cylindrical wall 42b to come into contact with the inner periphery of the opening 41, and this prevents the speaker grille 42 from deviating in its radial direction and hence surely prevents the outer periphery of the speaker grille 42 from coming into contact with the projecting part 49.

Although the present disclosure has been described herein with respect to a number of specific illustrative examples, the foregoing description is intended to illustrate, rather than to limit the disclosure. Those skilled in the art will realize that many modifications of the illustrative examples could be made which would be operable. All such modifications, which are within the scope of the claims, are intended to be within the scope and spirit of the present disclosure.

The invention claimed is:

1. A member-fastening structure to fasten and fix together three members, each being a first member, a second member, and a third member held between the first member and the second member, by means of a fastening member,
   wherein the first member has a first through-hole along a direction in which the three members are placed one over another,
   the second member has a projecting part to be inserted into the first through-hole of the first member, the projecting part having a second through-hole penetrating along a direction perpendicular to the direction in which the three members are placed one over another,
   the third member has an indexing part which engages with a passive indexing part provided at a position away from the first through-hole in the first member or at a position away from the projecting part in the second member so as to be positioned on either of the first member or the second member,
   the fastening member has an elastically deformable sidewall configured to be inserted into the second through-hole and a regulating projection configured to be inserted into the first through-hole, and
   the fastening member is configured to be inserted into the second through-hole of the projecting part projecting to a back side of the first member through the first through-hole and and twisted once inserted thereby elastically deforming the sidewall and fixing the third member held between the first member and the second member and engaging with the second through-hole and the back side of the first member.

2. The member-fastening structure according to claim 1, wherein the first member is fixed to a vehicle,
   the second member is arranged on an outer side of a vehicle body relative to the first member and the third member, and the projecting part is arranged at a plurality of positions so as to project toward an inner side of the vehicle body, and
   the third member is arranged inside the plurality of projecting parts of the second member so that the third member has its outer periphery held and fixed between the first member and the second member.

3. The member-fastening structure according to claim 2, wherein the second member is an annular member, the projecting part is formed within a width of the annular shape of the second member such that a lengthwise direction of the projecting part is along a circular arc direction of the annular shape, and the second through-hole penetrates through the projecting part along a radial direction of the annular shape of the second member.

4. The member-fastening structure according to claim 3, wherein the projecting parts are formed at three approximately equally spaced places along the annular shape of the second member, and both the indexing part and the passive indexing part are arranged between two adjacent projecting parts of the second member.

5. The member-fastening structure according to claim 4, wherein the first member is a covering member that covers the vehicle body and has an opening, the third member is a speaker grille attached to a periphery of the opening of the covering member, and the second member is a speaker ring that covers an outside of a periphery of the speaker grille and is attached to the covering member.

6. The member-fastening structure according to claim 1, wherein the second member is an annular member, the projecting part is formed within a width of the annular shape of the second member such that a lengthwise direction of the projecting part is along a circular arc direction of the annular shape, and the second through-hole penetrates through the projecting part along a radial direction of the annular shape of the second member.

7. The member-fastening structure according to claim 6, wherein the projecting parts are formed at three approximately equally spaced places along the annular shape of the second member, and both the indexing part and the passive indexing part are arranged between two adjacent projecting parts of the second member.

8. The member-fastening structure according to claim 7, wherein the first member is a covering member that covers the vehicle body and has an opening, the third member is a speaker grille attached to a periphery of the opening of the covering member, and the second member is a speaker ring that covers an outside of a periphery of the speaker grille and is attached to the covering member.

9. The member-fastening structure according to claim 1, wherein the first member is a covering member that covers the vehicle body and has an opening, the third member is a speaker grille attached to a periphery of the opening of the covering member, and the second member is a speaker ring that covers an outside of a periphery of the speaker grille and is attached to the covering member.

10. The member-fastening structure according to claim 1, wherein the passive indexing part comprises a notch on an inner peripheral surface of an opening of the first member.

11. The member-fastening structure according to claim 1, wherein the indexing part is disposed at a position corresponding to the passive indexing part.

* * * * *